United States Patent
An et al.

(10) Patent No.: US 9,823,729 B2
(45) Date of Patent: Nov. 21, 2017

(54) DISPLAY APPARATUS AND METHOD OF DRIVING THE SAME

(71) Applicant: SAMSUNG DISPLAY CO., LTD., Yongin-si, Gyeonggi-Do (KR)

(72) Inventors: Taehyeong An, Yongin (KR); Suhyeong Park, Yongin (KR); Soowan Yoon, Yongin (KR)

(73) Assignee: SAMSUNG DISPLAY CO., LTD., Yongin-Si, Gyeonggi-Do (KR)

( * ) Notice: Subject to any disclaimer, the term of this patent is extended or adjusted under 35 U.S.C. 154(b) by 55 days.

(21) Appl. No.: 14/831,065

(22) Filed: Aug. 20, 2015

(65) Prior Publication Data
US 2016/0124491 A1    May 5, 2016

(30) Foreign Application Priority Data
Oct. 29, 2014    (KR) .................. 10-2014-0148448

(51) Int. Cl.
*G06F 1/00* (2006.01)
*G06F 1/32* (2006.01)

(52) U.S. Cl.
CPC ........ *G06F 1/3265* (2013.01); *Y02B 60/1242* (2013.01); *Y02B 60/32* (2013.01)

(58) Field of Classification Search
None
See application file for complete search history.

(56) References Cited

U.S. PATENT DOCUMENTS

| | | | |
|---|---|---|---|
| 2010/0177024 A1* | 7/2010 | Choi | G09G 3/3233 345/76 |
| 2011/0057917 A1 | 3/2011 | Ryu et al. | |
| 2013/0082910 A1* | 4/2013 | Lee | G09G 3/3208 345/76 |
| 2013/0113811 A1* | 5/2013 | Choi | G09G 3/3648 345/520 |
| 2013/0201172 A1 | 8/2013 | Jeong et al. | |
| 2015/0116266 A1* | 4/2015 | Inoue | G06F 3/0416 345/174 |

FOREIGN PATENT DOCUMENTS

| | | |
|---|---|---|
| KR | 10-2011-0026152 A | 3/2011 |
| KR | 10-2013-0075429 A | 7/2013 |
| KR | 10-2013-0091136 A | 8/2013 |
| KR | 10-2014-0077452 A | 6/2014 |

* cited by examiner

*Primary Examiner* — Nitin Patel
(74) *Attorney, Agent, or Firm* — Lee & Morse P.C.

(57) ABSTRACT

A display apparatus includes a display panel and a power supply. The display panel displays an image at a first driving frequency in a normal mode and displays an image at a second driving frequency in a low power mode. The second driving frequency is lower than the first driving frequency. The power supply outputs a first initialization voltage at a first level to the display panel during an active period of the low power mode. The power supply outputs a second initialization voltage at a second level to the display panel during at least a portion of a blank period of the low power mode. The second level is higher than the first level.

16 Claims, 5 Drawing Sheets

DISPLAY APPARATUS AND METHOD OF DRIVING THE SAME

CROSS-REFERENCE TO RELATED APPLICATION

Korean Patent Application No. 10-2014-0148448, filed on Oct. 29, 2014, and entitled, "Display Apparatus and Method Of Driving The Same," is incorporated by reference herein in its entirety.

BACKGROUND

1. Field

One or more embodiments described herein relate to a display apparatus and a method for driving a display apparatus.

2. Description of the Related Art

A display apparatus may be driven at different frequencies depending on its operational mode. In a low power mode, the driving frequency may be lowered than the driving frequency in a normal mode in order to reduce power consumption. However, flicker may occur in low power mode because of the low driving frequency. As a result, display quality may be degraded.

SUMMARY

In accordance with one embodiment, a display apparatus includes a display panel to display an image at a first driving frequency in a normal mode and to display an image at a second driving frequency lower than the first driving frequency in a low power mode; and a power supply to output a first initialization voltage at a first level to the display panel during an active period of the low power mode and to output a second initialization voltage at a second level to the display panel during at least a portion of a blank period of the low power mode, wherein the second level is higher than the first level.

The power supply may output the first initialization voltage during a first period of the blank period of the low power mode, and output the second initialization voltage during a second period that is subsequent to the first period of the blank period. A length of the first period may be substantially equal to a length of a blank period of the normal mode.

The display panel may include a plurality of pixels, each of the pixels including an organic light-emitting diode; a second transistor including a gate electrode connected to a first scan line, a first electrode connected to a data line, and a second electrode connected to a first node; a capacitor connected between a first power voltage line and a second node; a first transistor including a gate electrode connected to the second node, a first electrode connected to the first node, and a second electrode connected to a third node; a third transistor including a gate electrode connected to the first scan line, a first electrode connected to the third node, and a second electrode connected to the second node; a fourth transistor including a gate electrode connected to a second scan line, a first electrode connected to an initialization voltage line, and a second electrode connected to the second node; a fifth transistor including a gate electrode connected to an emission control line, a first electrode connected to the first power voltage line, and a second electrode connected to the first node; and a sixth transistor including a gate electrode connected to the emission control line, a first electrode connected to the third node, and a second electrode connected to an anode of the organic light-emitting diode.

The second initialization voltage may be a value that is approximately equal to a voltage of the gate electrode of the first transistor or a value that is approximately equal to an average of voltages of gate electrodes of a plurality of first transistors.

During a first portion of the blank period of the low power mode, the fifth transistor and the sixth transistor may be turned on, the first to fourth transistors are turned off, and the second initialization voltage may be applied to the initialization voltage line; and during a second portion of the blank period of the low power mode, the fifth transistor and the sixth transistor may be turned on, the first to fourth transistors are turned off, and the first initialization voltage may be applied to the initialization voltage line.

Each of the pixels may include a seventh transistor connected between the initialization voltage line and the anode of the organic light-emitting diode, and the seventh transistor is to turn on based on a second scan signal to initialize the anode of the organic light-emitting diode.

Each of the pixels may include an auxiliary capacitor connected between the second node and the initialization voltage line. The power supply may output the first initialization voltage during a first period of the blank period of the low power mode, and increasingly output the second initialization voltage from the first level to the second level during a second period subsequent to the first period of the blank period.

Each of the pixels may include a seventh transistor connected between the initialization voltage line and the anode of the organic light-emitting diode, and the seventh to turn on based on a second scan signal to initialize the anode of the organic light-emitting diode.

In accordance with another embodiment, a method of driving a display apparatus includes outputting a first initialization voltage at a first level to a display panel during an active period of a low power mode; and outputting a second initialization voltage at a second level the display panel during at least a portion of a blank period of the low power mode, wherein the second level is higher than the first level and wherein the display panel operates at a first driving frequency in normal mode and a second driving frequency in the low power mode, the second driving frequency lower than the first driving frequency.

Outputting the second initialization voltage may include outputting the first initialization voltage during a first period of the blank period of the low power mode, and outputting the second initialization voltage during a second period that is subsequent to the first period of the blank period. A length of the first period may be substantially equal to a length of a blank period of the normal mode.

The display panel may include a plurality of pixels, each of the pixels including an organic light-emitting diode; a second transistor including a gate electrode connected to a first scan line, a first electrode connected to a data line, and a second electrode connected to a first node; a capacitor connected between a first power voltage line and a second node; a first transistor including a gate electrode connected to the second node, a first electrode connected to the first node, and a second electrode connected to a third node; a third transistor including a gate electrode connected to the first scan line, a first electrode connected to the third node, and a second electrode connected to the second node; a fourth transistor including a gate electrode connected to a second scan line, a first electrode connected to an initialization voltage line, and a second electrode connected to the second node; a fifth transistor including a gate electrode connected to an emission control line, a first electrode connected to the first power voltage line, and a second electrode connected to the first node; and a sixth transistor including a gate electrode connected to the emission control line, a first electrode connected to the third node, and a second electrode connected to an anode of the organic light-emitting diode.

The second initialization voltage may be a value that is approximately equal to a voltage of the gate electrode of the first transistor, or a value that is approximately equal to an average of voltages of gate electrodes of a plurality of first transistors.

During a first portion of the blank period of the low power mode, the method may include turning on the fifth transistor and the sixth transistor, turning off the first to fourth transistors, and applying the second initialization voltage to the initialization voltage line; and during a second portion of the blank period of the low power mode, the method may include turning on the fifth transistor and the sixth transistor, turning off the first to fourth transistors, and applying the first initialization voltage to the initialization voltage line.

Each of the pixels may include a seventh transistor connected between the initialization voltage line and the anode of the organic light-emitting diode, the method including turning on the seventh transistor based on a second scan signal to initialize the anode of the organic light-emitting diode.

Each of the pixels may include an auxiliary capacitor connected between the second node and the initialization voltage line. Outputting of the second initialization voltage may include outputting the first initialization voltage during a first period of the blank period of the low power mode, and increasingly outputting the second initialization voltage from the first level to the second level during a second period that is subsequent to the first period of the blank period.

Each of the pixels may include a seventh transistor connected between the initialization voltage line and the anode of the organic light-emitting diode, the method including turning on the seventh transistor base don a second scan signal to initialize the anode of the organic light-emitting diode.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
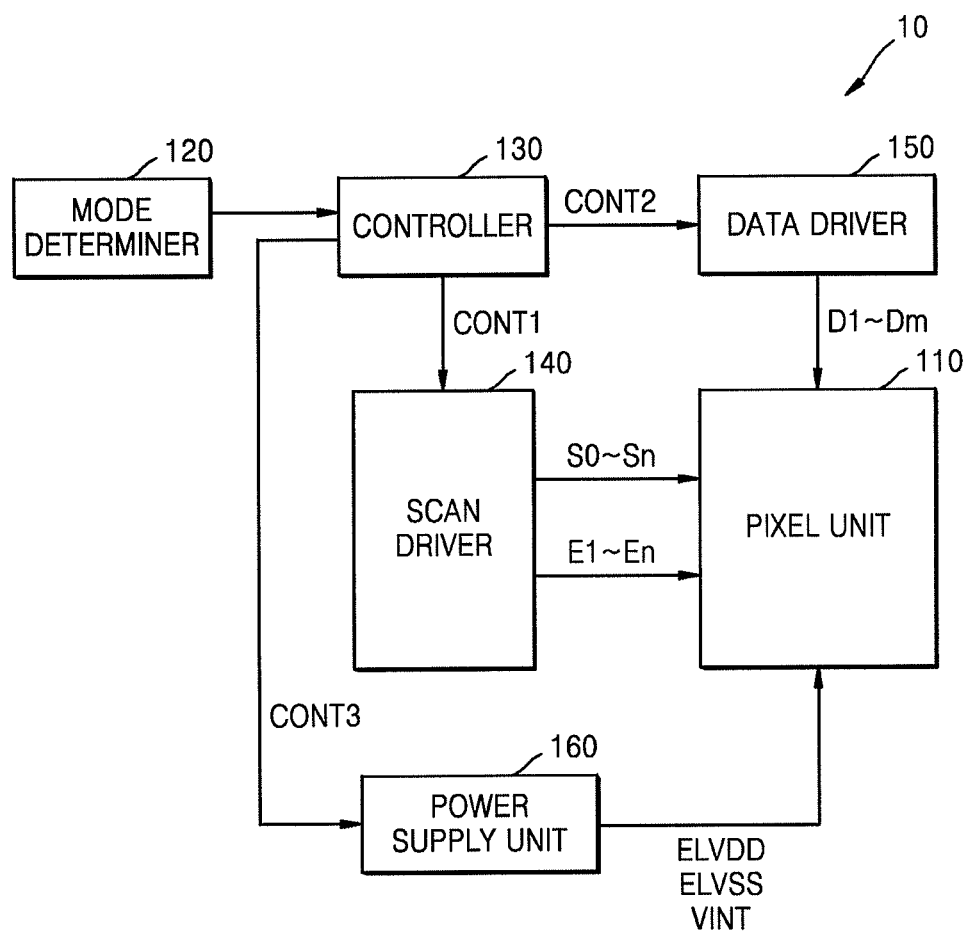
FIG. 1 illustrates an embodiment of a display apparatus.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. In the drawings, the dimensions of layers and regions may be exaggerated for clarity of illustration. Like reference numerals refer to like elements throughout.

FIG. 1 illustrates an embodiment of a display apparatus 10 which includes a pixel unit 110, a mode determiner 120, a controller 130, a scan driver 140, a data driver 150, and a power supply unit 160. The display apparatus 10 may be an organic light-emitting display apparatus or another type of display apparatus.

The pixel unit 110 (or display panel) includes a plurality of scan lines, a plurality of data lines, a plurality of emission control lines, a plurality of first power voltage lines, and a plurality of pixels. The scan lines are separately arranged at regular distances in rows. The scan lines respectively transmit scan signals S0 through Sn. The data lines are separately arranged at regular distances in columns. The data lines respectively transmit data signals D1 through Dm. The scan lines and the data lines are arranged in a matrix form. The pixels are at areas where the scan lines and data lines intersect. The emission control lines respectively transmit emission control signals E1 through En. A first power voltage ELVDD is transmitted through the first power voltage lines. The first power voltage lines may be, for example, in a grid or mesh form.

The mode determiner 120 determines a driving mode of the display apparatus 10 based on an operation control signal supplied, for example, from an external or other source. The mode determiner 120 supplies a mode signal corresponding to the driving mode to the controller 130. The mode determiner 120 may determine the type of image based on input image data and the driving mode based on the type of image.

The driving mode may include a normal mode (in which an image is displayed at a first driving frequency) and a low power mode (in which an image is displayed at a second driving frequency that is lower than the first driving frequency). For example, unless an operation control signal (e.g., a signal input from a keyboard) is received in a certain time period, the mode determiner 120 determines the driving mode as a low power mode and supplies the low power control signal to the controller 130. Otherwise, the mode determiner 120 may determine the driving mode as a normal mode and supplies a general control signal to the controller 130. Also, unless an operation control signal is received in a certain time period, the mode determiner 120 may analyze the input image data.

For example, if an image displayed by the pixel unit 110 is a still image, the mode determiner 120 may supply a low power control signal to the controller 130. If the image displayed by the pixel unit 110 is a moving image, the mode determiner 120 may supply a general control signal to the controller 130. The certain time period, for which no operation control signal is supplied, may be a predetermined period.

The controller 130 receives input image data and an input control signal for controlling display of the input image data, for example, from an external graphic controller. Examples of the input control signal include a vertical synchronization signal, a horizontal synchronization signal, and a main clock. Based on the vertical synchronization signal, the horizontal synchronization signal, and the main clock, the controller 130 generates a first control signal CONT1, a second control signal CONT2, a third control signal CONT3, and a data signal.

The first, second, and third control signals CONT1, CONT2, and CONT3 may respectively include one or more control signals. For example, the first control signal CONT1 may include a scan start signal SSP for instructing scan start, a plurality of clock signals SCLK, and a frequency control signal. The controller 130 generates the first control signal CONT1 and transmits the first control signal CONT1 to the scan driver 140. The controller 130 transmits the data signal and the second control signal CONT2 to the data driver 150. The controller 130 generates the third control signal CONT3 and transmits the third control signal CONT3 to the power supply unit 160.

If the general control signal is input by the mode determiner 120, the controller 130 supplies a frequency control signal having a first voltage level to the scan driver 140, the data driver 150, and the power supply unit 160. If the low power control signal is input by the mode determiner 120, the controller 130 supplies a frequency control signal having a second voltage level, which is a different level from the first voltage level, to the scan driver 140, the data driver 150, and the power supply unit 160. The frequency control signal may be included in the first, second, and third control signals CONT1, CONT2, and CONT3. The controller 130 generates a data enable signal and transmits the data enable signal to the data driver 150.

The scan driver 140 is connected to the scan lines of the pixel unit 110. The scan driver 140 sequentially applies the scan signals S0 through Sn (e.g., a gate-on voltage or a gate-off voltage) to the scan lines according to the first control signal CONT1. For example, when the scan signals S0 through Sn have a gate-on voltage, switching transistors of the pixels (which are connected to respective scan lines) are turned-on.

According to the first control signal CONT1, the scan driver 140 also generates the emission control signals E1 through En (e.g., a gate-on voltage or a gate-off voltage) and sequentially applies the emission control signals E1 through En to the emission control lines. The scan driver 140 controls output of scan signals based on the frequency control signal input by the controller 130.

The data driver 150 is connected to the data lines of the pixel unit 110. The data driver 150 applies the data signals D1 through Dm, which denote gradation, to the data lines according to the second control signal CONT2. The data driver 150 converts input image data having gradation, which is input by the controller 130, to a data signal in the form of voltage or current. The data driver 150 controls output of data signals based on the frequency control signal and the data enable input by the controller 130.

The power supply unit 160 generates the first power voltage ELVDD and a second power voltage ELVSS. The power supply unit 160 applies the first power voltage ELVDD and second power voltage ELVSS to the pixel unit 110 according to the third control signal CONT3. A voltage level of the first power voltage ELVDD is higher than that of the second power voltage ELVSS. According to the third control signal CONT3, the power supply unit 160 generates an initialization voltage VINT and applies the initialization voltage VINT to the pixel unit 110. The power supply unit 160 varies and outputs the initialization voltage VINT depending on the driving mode.

The power supply unit 160 detects active periods and blank periods of the normal mode and the low power mode from the third control signal CONT3, and varies and outputs an initialization voltage during at least a portion of a blank period in the low power mode. The power supply unit 160 outputs a first initialization voltage at a first level during an active period and a blank period of the normal mode. The power supply unit 160 outputs the first initialization voltage during an active period of the low power mode and outputs a second initialization voltage at a second level, which is higher than the first level, during at least a portion of the blank period in the low power mode.

The power supply unit 160 may output the first initialization voltage during a first period of the blank period of the low power mode and may output the second initialization voltage during a second period of the blank period subsequent to the first period. The power supply unit 160 may output the first initialization voltage during the first period of the blank period of the low power mode and may output the second initialization voltage increasing from the first level to the second level during the second period of the blank period subsequent to the first period.

The mode determiner 120, the controller 130, the scan driver 140, the data driver 150, and the power supply unit 160 may be embodied in separate integrated circuit chips or one integrated circuit chip, and, for example, may be directly mounted on a substrate where the pixel unit 110 is formed. Also, the mode determiner 120, the controller 130, the scan driver 140, the data driver 150, and the power supply unit 160 may be mounted, for example, on a flexible printed circuit film, attached to a substrate in the form of a tape carrier package (TCP), or directly formed on the substrate.

Although, in the present embodiment, the scan driver 140 generates the emission control signals E1 through En and applies the emission control signals E1 through En to the pixel unit 110, an emission control driving unit may generate the emission control signals E1 through En and apply the emission control signals E1 through En to the pixel unit 110. Also, in the present embodiment, the power supply unit 160 generates the initialization voltage VINT and applies the initialization voltage VINT to the pixel unit 110. However, an initialization voltage supply unit may generate the initialization voltage VINT and apply the initialization voltage VINT to the pixel unit 110.

Figure 2:
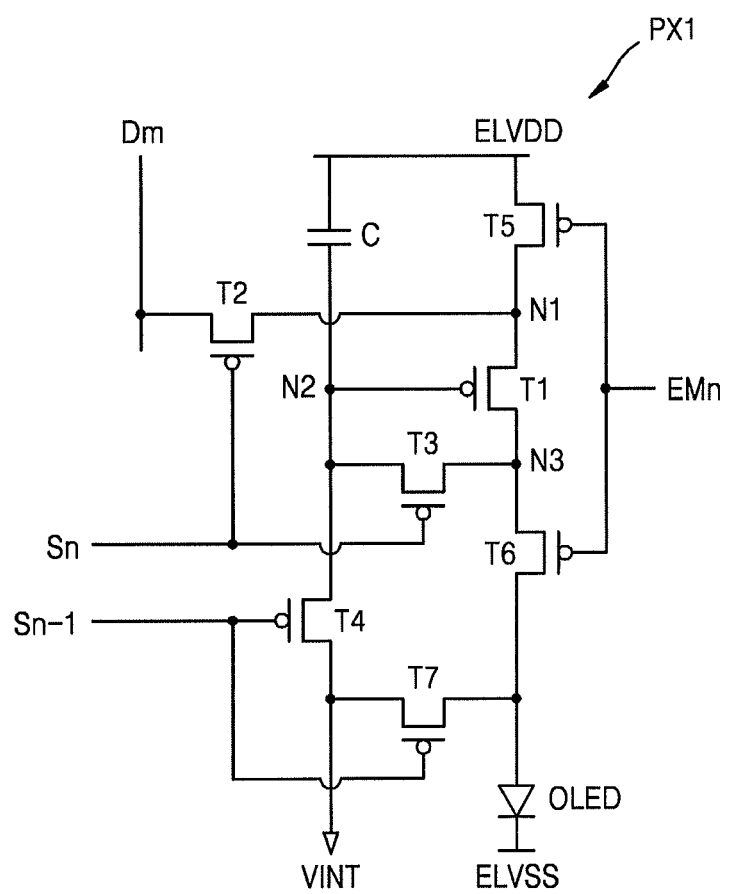
FIG. 2 illustrates an embodiment of a pixel.

FIG. 2 illustrates an embodiment of a pixel PX1, which, for example, may be included in the display apparatus 10. Referring to FIG. 2, the pixel PX1 includes a plurality of transistors (e.g., first to seventh transistors T1 through T7), a capacitor C, and a light-emitting device. The light-emitting device may be, for example, an organic light-emitting diode OLED. The pixel PX1 at an n-th pixel row and m-th pixel column will be described as an example.

The pixel PX1 is one of a plurality of pixels in the n-th pixel row, and is respectively connected to a scan line corresponding to the n-th pixel row and another scan line corresponding to an (n−1)th pixel row before the n-th pixel row. Although the pixel PX1 is connected to a scan line corresponding to a pixel row and another scan line corresponding to the previous pixel row, the pixel PX1 may be connected, for example, to two scan lines in another embodiment.

The pixel PX1 is connected to a first scan line transmitting a first scan signal Sn to the second transistor T2 and the third transistor T3, a second scan line transmitting a second scan signal Sn-1 to the fourth transistor T4 and the seventh transistor T7, an emission control line transmitting an emission control signal EMn to the fifth transistor T5 and the sixth transistor T6, a data line intersecting with the first scan line and transmitting a data signal Dm, a power voltage line transmitting a first power voltage ELVDD, and an initialization voltage line transmitting an initialization voltage VINT for initializing the first transistor T1 and an anode of the organic light-emitting diode OLED.

The first transistor T1 includes a gate electrode connected to a first electrode of the capacitor C, a first electrode connected to a first node N1, and a second electrode connected to a third node N3. The first transistor T1 serves as a driving transistor. The first transistor T1 receives the data signal Dm according to a switching operation of the second transistor T2, and thus supplies current to the organic light-emitting diode OLED.

The second transistor T2 includes a gate electrode connected to the first scan line, a first electrode connected to the data line, and a second electrode connected to the first electrode of the first transistor T1 at the first node N1. As the second transistor T2 is turned on according to the first scan signal Sn transmitted through the first scan line, the second transistor T2 serves as a switching transistor for transmitting the data signal Dm transmitted through the data line to the first electrode of the first transistor T1.

The third transistor T3 includes a gate electrode connected to the first scan line, a first electrode connected to the second electrode of the first transistor T1 at the third node N3, and a second electrode which is, at a second node N2, connected to the first electrode of the capacitor C, a second electrode of the fourth transistor T4, and the gate electrode of the first transistor T1. As the third transistor T3 is turned on according to the first scan signal Sn transmitted through the first scan line, the third transistor T3 diode-connects the first transistor T1.

The fourth transistor T4 includes a gate electrode connected to the second scan line, a first electrode connected to the initialization voltage line, and the second electrode (which is, at the second node N2) connected to the first electrode of the capacitor C, the second electrode of the third transistor T3, and the gate electrode of the first transistor T1. The first electrode and the second electrode of the fourth transistor T4 become a source electrode and a drain electrode according to a current direction. As the fourth transistor T4 is turned on according to the second scan signal Sn-1 transmitted through the second scan line, the fourth transistor T4 performs an initialization operation of initializing a voltage of the gate electrode of the first transistor T1 by transmitting the initialization voltage VINT to the gate electrode of the first transistor T1.

The fifth transistor T5 includes a gate electrode connected to the emission control line, a first electrode connected to a first power voltage line, and a second electrode connected to the first electrode of the first transistor T1 and the second electrode of the second transistor T2 at the first node N1.

The sixth transistor T6 includes a gate electrode connected to the emission control line, a first electrode connected to the second electrode of the first transistor T1 and the first electrode of the third transistor T3 at the third node N3, and a second electrode connected to the anode of the organic light-emitting diode OLED. As the fifth transistor T5 and the sixth transistor T6 are simultaneously turned on according to the emission control signal EMn transmitted through the emission control line, the first power voltage ELVDD is transmitted to the organic light-emitting diode OLED. Thus, current flows in the organic light-emitting diode OLED.

The seventh transistor T7 includes a gate electrode connected to the second scan line, a first electrode connected to the second electrode of the sixth transistor T6 and the anode of the organic light-emitting diode OLED, and a second electrode connected to the initialization voltage line. The first electrode and the second electrode of the seventh transistor T7 become a source electrode and a drain electrode according to a current direction. As the seventh transistor T7 is turned on according to the second scan signal Sn-1 transmitted through the second scan line, the seventh transistor T7 performs an initialization operation of initializing a voltage of the anode of the organic light-emitting diode OLED by transmitting the initialization voltage VINT to the anode of the organic light-emitting diode OLED.

The capacitor C includes the first electrode (which is, at the second node N2) connected to the gate electrode of the first transistor T1, the second electrode of the third transistor T3, and the second electrode of the fourth transistor T4, and a second electrode connected to the first power voltage line.

The cathode of the organic light-emitting diode OLED is connected to a second power source supplying a second power voltage ELVSS. The organic light-emitting diode OLED receives current from the first transistor T1, and thus emits light for displaying an image.

The pixel PX1 performs an initialization operation, a data writing operation, and an emission operation during one frame. During an initialization period, the pixel PX1 receives the second scan signal Sn-1 of a gate-on voltage (e.g., low level) through the second scan line. The fourth transistor T4 and the seventh transistor T7 are turned on based on the second scan signal Sn-1. As a first initialization voltage VINT1 is transmitted to the gate electrode of the first transistor T1 via the fourth transistor T4, the gate electrode of the first transistor T1 is initialized. In addition, as the first initialization voltage VINT1 is transmitted to the anode of the organic light-emitting diode OLED via the seventh transistor T7, the anode of the organic light-emitting diode OLED is initialized.

Thereafter, during a data writing period, the pixel PX1 receives the first scan signal Sn of a gate-on voltage (e.g., low level) through the first scan line. The second transistor T2 and the third transistor T3 are turned on based on the first scan signal Sn. The data signal Dm supplied through the data line is transmitted to the first node N1 via the second transistor T2. The first transistor T1 is diode-connected by the turned-on third transistor T3 and thus biased in a forward direction. A compensation voltage DATA+Vth (e.g., Vth is a negative value), which is reduced as much as a threshold voltage Vth of the first transistor T1, is applied to the gate electrode of the first transistor T1. The first power voltage ELVDD and the compensation voltage DATA+Vth are applied to the terminals of the capacitor C, and a charge corresponding to a difference between voltages of the two terminals of the capacitor C is stored in the capacitor C.

Thereafter, during an emission period, the emission control signal EMn supplied through the emission control line is changed from a gate-off voltage (e.g., high level) to a gate-on voltage (e.g., low level). Then, the fifth transistor T5 and the sixth transistor T6 are turned on by the emission control signal EMn of the low level. Accordingly, current based on a voltage difference between a voltage of the gate electrode of the first transistor T1 and the first power voltage ELVDD is formed. The current is supplied to the organic light-emitting diode OLED via the sixth transistor T6.

During the emission period, a gate-source voltage Vgs of the first transistor T1 is maintained at '(DATA+Vth)−ELVDD' by the capacitor C. According to a current-voltage relation of the first transistor T1, the current is proportional to the square of a value obtained by subtracting a threshold voltage from a gate-source voltage, e.g. '$(DATA-ELVDD)^2$.' Thus, current is determined regardless of the threshold voltage Vth of the first transistor T1.

In one embodiment, a blank period may correspond to or include a time period between after a scan signal is applied to the last scan line of one frame to output data and before a scan signal is applied to the first scan line of the next frame to output data. Another or a remaining period may be referred to as an active period.

The pixel PX1 performs the initialization operation, the data writing operation, and the emission operation at each active period of every frame in a normal mode and a low power mode. During the blank period, the pixel PX1 keeps emitting light due to the emission control signal EMn of the low level. However, data is not applied. Because the display apparatus 10 keeps emitting light, not only during the active period where data is output, but also during the blank period where no data is output, leakage current occurs from switching devices which are off during the blank period.

During the emission period of the active period and the blank period, the third transistor T3 and the fourth transistor T4 are turned off and the fifth transistor T5 and the sixth transistor T6 are turned on. Leakage current occurs due to the turned-off third and fourth transistors T3 and T4. The voltage of the gate electrode of the first transistor T1 is reduced by the leakage current. As the voltage of the gate electrode of the first transistor T1 decreases, luminance of the organic light-emitting diode OLED gradually increases.

For example, leakage current by the fourth transistor T4 is greater than leakage current by the third transistor T3. Also, whereas the blank period is short in the normal mode, the blank period is long in the low power mode. Accordingly, as a result of the increased luminance of the pixel PX1 during the blank period of one frame in the low power mode, a flicker occurs when the initialization operation of the next frame is started.

In one embodiment, during at least a portion of the blank period in the low power mode, a second initialization voltage VINT2 of a second level, that is higher than a first level, is applied to the pixel PX1. The second initialization voltage VINT2 may be set as a value that is approximately the voltage of the gate electrode of the first transistor T1. Alternatively, the second initialization voltage VINT2 may be set as a value that is approximately an average of voltages of gate electrodes of first transistors T1.

In one embodiment, a voltage difference between the first electrode and the second electrode of the fourth transistor T4, which is turned off during the blank period in the low power mode, is reduced to reduce the leakage current of the fourth transistor T4. This may alleviate the voltage decrease of the gate electrode of the first transistor T1. As a result, an increase in luminance may be reduced or inhibited during the blank period, and the occurrence of flicker may be reduced or prevented.

Figure 3:
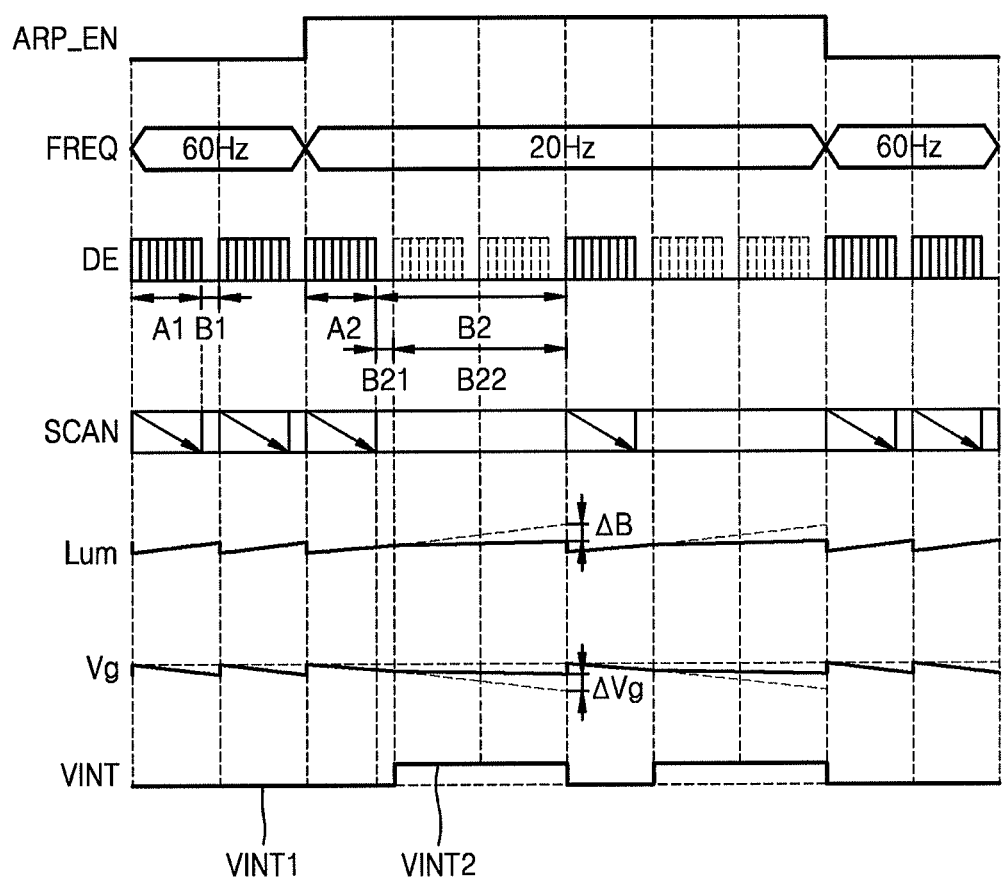
FIG. 3 illustrates examples of control signals for a display apparatus.

FIG. 3 is a timing diagram illustrating examples of control signals for driving a display apparatus, which, for example, may be display apparatus 10. The display apparatus may include the pixel PX1 of FIG. 2 included in the pixel unit 110 of FIG. 1.

In a normal mode (for example, in a 60 Hz driving mode), a frequency control signal ARP_EN is at a first voltage level. In an active period A1 of every frame, a scan signal SCAN (e.g., a first scan signal and a second scan signal) are sequentially applied via a first scan line to the final scan line, and a data signal is applied to the pixel PX1 in response to a data enable signal DE.

Each pixel PX1 performs an initialization operation, a data writing operation, and an emission operation in the active period A1. During the active period A1 and a blank period B1 of the normal mode, a first initialization voltage VINT1 is applied.

In a low power mode (for example, in a 20 Hz driving mode), the frequency control signal ARP_EN is at a second voltage level. In an active period A2 of every frame, the scan signal SCAN (e.g., the first scan signal and the second scan signal) are sequentially applied via the first scan line to the final scan line, and the data signal is applied to the pixel PX1 based on the data enable signal DE.

Each pixel PX1 performs initialization, data writing, and emission operations in the active period A2. During the active period A2 and a first period B21 of a blank period B2 of the low power mode, the first initialization voltage VINT1 is applied. During a second period B22 of the blank period B2, a second initialization voltage VINT2 is applied. The length of the first period B21 of the blank period B2 may correspond to the length of the blank period B1 of the normal mode.

During the first period B21 of the blank period B2, a voltage Vg of a gate electrode of a first transistor T1 gradually decreases, and luminance Lum gradually increases. By the second initialization voltage VINT2 applied during the second period B22 of the blank period B2, the voltage Vg of the gate electrode of the first transistor T1 is maintained at a gate electrode voltage at a time when the first period B21 ends. Thus, a voltage decrease $\Delta Vg$ of the gate electrode and a luminance increase $\Delta B$ are reduced or inhibited. Therefore, a flicker phenomenon may be reduced or prevented in the low power mode.

Figure 4:
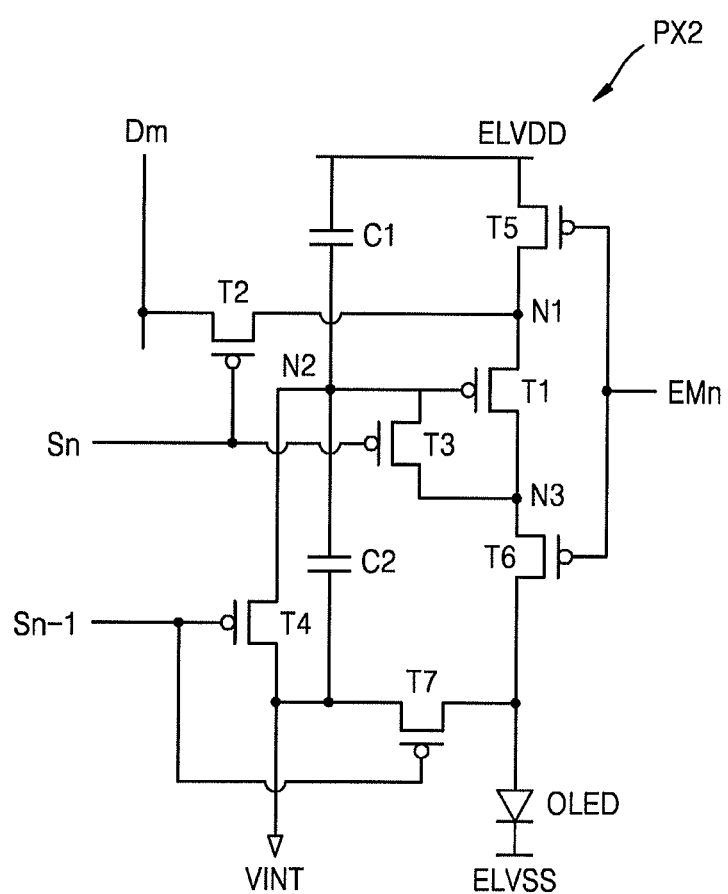
FIG. 4 illustrates another embodiment of a pixel.

FIG. 4 illustrates another embodiment of a pixel PX2 of a display apparatus, which, for example, may be a display apparatus 10. Referring to FIG. 4, the pixel PX2 includes a plurality of transistors (e.g., T1 through T7), a first capacitor C1, a second capacitor C2, and a light-emitting device. The light-emitting device may be, for example, an organic light-emitting diode OLED. The pixel PX2 is different from the pixel PX1 of FIG. 2 in that the second capacitor C2 is added.

In pixel PX2, the first capacitor C1 includes a second electrode connected to a first power voltage line and a first electrode connected to a second node N2. The first electrode of the first capacitor C1 is connected to a gate electrode of the first transistor T1, a second electrode of the third transistor T3, and a second electrode of the fourth transistor T4.

The second capacitor C2 includes a first electrode connected to an initialization voltage line and a second electrode connected to the second node N2. The first electrode of the second capacitor C2 is connected to a first electrode of the fourth transistor T4 and a second electrode of the seventh transistor T7. The second electrode of the second capacitor C2 is connected to the gate electrode of the first transistor T1, the second electrode of the third transistor T3, and the second electrode of the fourth transistor T4. The second capacitor C2, as a boosting capacitor, is an auxiliary capacitor for preventing voltage fluctuation at the second node N2 when the fourth transistor T4 is turned off.

The pixel PX2 performs an initialization operation, a data writing operation, and an emission operation during one frame. During an initialization period, the pixel PX2 receives a second scan signal Sn-1 of a gate-on voltage (e.g., low level) through a second scan line. Based on the second scan signal Sn-1, the fourth transistor T4 and the seventh transistor T7 are turned on. As a first initialization voltage VINT1 is transmitted to the gate electrode of the first transistor T1 via the fourth transistor T4, the gate electrode of the first transistor T1 is initialized. In addition, as the first initialization voltage VINT1 is transmitted to an anode of an organic light-emitting diode OLED via the seventh transistor T7, the anode of the organic light-emitting diode OLED is initialized. As an identical first initialization voltage VINT1 is applied to the first electrode and the second electrode of the second capacitor C2, the second capacitor C2 is reset.

Thereafter, during a data writing period, the pixel PX2 receives a first scan signal Sn of a gate-on voltage (e.g., low level) through a first scan line. Based on the first scan signal Sn, the second transistor T2 and the third transistor T3 are turned on. A data signal Dm supplied through a data line is transmitted to a first node N1 via the second transistor T2. The first transistor T1 is diode-connected by the turned-on third transistor T3 and thus biased in a forward direction. A compensation voltage DATA+Vth (e.g., Vth is a negative value), which is reduced as much as a threshold voltage Vth of the first transistor T1, is applied to the gate electrode of the first transistor T1. A first power voltage ELVDD and the compensation voltage DATA+Vth are applied to terminals of the first capacitor C1. A charge corresponding to a difference between voltages of the two terminals of the first capacitor C1 is stored in the first capacitor C.

Thereafter, during an emission period, an emission control signal EMn supplied through an emission control line is changed from a gate-off voltage (e.g., high level) to a gate-on voltage (e.g., low level). Then, the fifth transistor T5 and the sixth transistor T6 are turned on by the emission control signal EMn of the low level. Accordingly, current according to a voltage difference between a voltage of the gate electrode of the first transistor T1 and the first power voltage ELVDD is formed. The current is supplied to the organic light-emitting diode OLED via the sixth transistor T6. During the emission period, a gate-source voltage Vgs of the first transistor T1 is maintained at '(DATA+Vth)−ELVDD' by the first capacitor C1. According to a current-voltage relation of the first transistor T1, current is proportional to the square of a value obtained by subtracting a threshold voltage from a gate-source voltage, e.g., '(DATA−ELVDD)$^2$.' Thus, current is determined regardless of the threshold voltage Vth of first transistor T1.

During the emission period of an active period and a blank period, the third transistor T3 and the fourth transistor T4 of the pixel PX2 are turned off and the fifth transistor T5 and the sixth transistor T6 are turned on. As leakage current of the third and fourth transistors T3 and T4 occurs, a gate electrode voltage of the first transistor T1 gradually decreases and luminance of the organic light-emitting diode OLED gradually increases.

In the present embodiment, during at least a portion of the blank period in a low power mode, a second initialization voltage VINT2 is increasingly applied to the pixel PX2 from a first level to a second level based on a voltage decreasing rate of a gate electrode of a driving transistor according to time. The second initialization voltage VINT2 may be set as a value that is approximately the voltage of the gate electrode of the first transistor T1 in the active period. Alternatively, the second initialization voltage VINT2 may be set as a value that is approximately an average of voltages of gate electrodes of a plurality of first transistors T1 in the active period.

As the second initialization voltage VINT2 gradually increases, a voltage level of the second electrode of the second capacitor C2 gradually increases. In response to this, the voltage level of the first electrode of the second capacitor C2 also gradually increases. As the gate electrode voltage of the first transistor T1 increases as much as reduced, fluctuations in the gate electrode voltage of the first transistor T1 may be reduced or prevented. According to the present embodiment, leakage current of the third and fourth transistors T3 and T4 may be all compensated for.

In the present embodiment, as a first electrode voltage of the second capacitor C2 is increased as much as the voltage of the gate electrode of the first transistor T1 is reduced due to the leakage current of the third and fourth transistors T3 and T4 (which are turned off during the blank period in the low power mode), the voltage of the gate electrode of the first transistor T1 is increased again. Thus, an increase in luminance may be reduced or inhibited during the blank period and the occurrence of flicker may be reduced or prevented.

Figure 5:
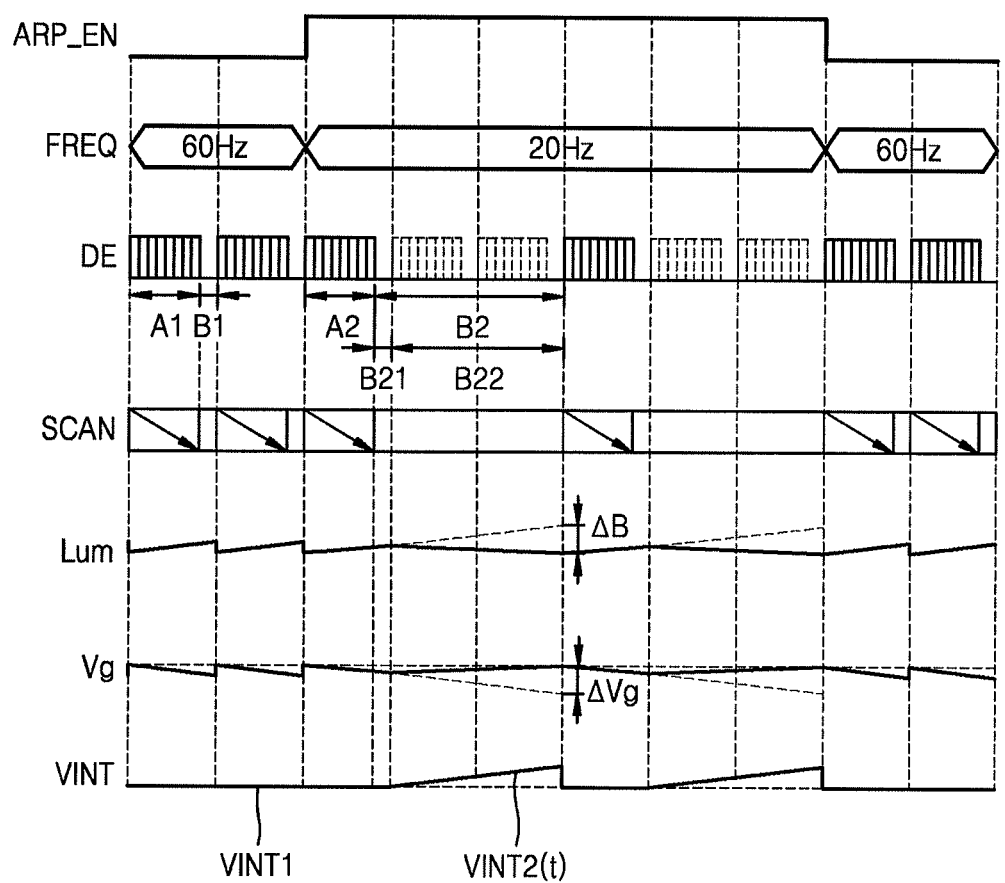
FIG. 5 illustrates additional examples of control signals for a display apparatus.

FIG. 5 is a timing diagram illustrating another embodiment of control signals for driving a display apparatus. FIG. 5 illustrates an example of a case in which the pixel PX2 of FIG. 4 is included in the pixel unit 110 of FIG. 1.

In a normal mode (for example, in a 60 Hz driving mode), a frequency control signal ARP_EN is a first voltage level. In an active period A1 of every frame, a scan signal SCAN (e.g., a first scan signal and a second scan signal) are sequentially applied via a first scan line to the final scan line, and a data signal is applied to the pixel PX2 in response to a data enable signal DE.

Each pixel PX2 performs an initialization operation, a data writing operation, and an emission operation in the active period A1. During the active period A1 and a blank period B1 of the normal mode, a first initialization voltage VINT1 is applied.

In a low power mode (for example, in a 20 Hz driving mode), the frequency control signal ARP_EN is at a second voltage level. In an active period A2 of every frame, the scan signal SCAN (e.g., the first scan signal and the second scan signal) are sequentially applied via the first scan line to the final scan line, and the data signal is applied to the pixel PX2 based on the data enable signal DE.

Each pixel PX2 performs initialization, data writing, and emission operations in the active period A2. During the active period A2 and a first period B21 of a blank period B2 of the low power mode, the first initialization voltage VINT1 is applied. During a second period B22 of the blank period B2, a second initialization voltage VINT2 is increasingly applied from a first level to a second level. The length of the first period B21 of the blank period B2 may correspond to the length of the blank period B1 of the normal mode.

During the first period B21 of the blank period B2, the voltage Vg of a gate electrode of a first transistor T1 gradually decreases and luminance Lum gradually increases. As the second initialization voltage VINT2 is applied with a slope during the second period B22 of the blank period B2, the voltage Vg of the gate electrode of the first transistor T1 increases (ΔVg) again, as much as reduced from a gate electrode voltage at a time when the first period B21 ends, and the luminance Lum decreases (ΔB). Therefore, flicker may be reduced or prevented in the low power mode.

In exemplary embodiments, the second initialization voltage VINT2 may be applied the same to all pixels. Also, different second initialization voltages VINT2 may be applied to regions or pixels.

Exemplary embodiments are not limited to a pixel structure illustrated herein and may be applied to low frequency driving of a display apparatus having a pixel structure in which a pixel is initialized by using an initialization power supply in a sequential driving method.

Transistors of a pixel circuit according to exemplary embodiments are p-type transistors. A gate-on voltage that turns on the transistors is a low level voltage, and a gate-off voltage that turns off the transistors is a high level voltage. The exemplary embodiments are not limited thereto, and the transistors of a pixel circuit may be n-type transistors. A gate-on voltage that turns on the transistors is a high level voltage, and a gate-off voltage that turns off the transistors is a low level voltage.

A transistor according to exemplary embodiments may be one of an amorphous silicon thin film transistor (amorphous- Si TFT), a low temperature poly-silicon (LTPS) TFT, or an oxide TFT. The oxide TFT may have an oxide such as amorphous indium-gallium-zinc oxide (IGZO), zinc oxide (ZnO), or titanium oxide (TiO) as an active layer.

By way of summation and review, a display apparatus may be driven at different frequencies depending on its operational mode. In a low power mode, the driving frequency may be lowered than the driving frequency in a normal mode in order to reduce power consumption. However, flicker may occur in low power mode because of the low driving frequency. As a result, display quality may be degraded.

In accordance with one or more of the aforementioned embodiments, a display apparatus may be driven by varying its driving frequency in a way that reduces power consumption. Furthermore, the voltage of a gate electrode of a driving transistor may be maintained constant during low frequency driving, thereby reducing or preventing flicker. Also, leakage current of a capacitor may be reduced by reducing a drop of the voltage of a gate electrode of a driving transistor, thereby reducing capacitor size.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A display apparatus, comprising:
a display panel to display a first image at a first driving frequency in a normal mode and to display a second image at a second driving frequency lower than the first driving frequency in a low power mode; and
a power supply to output a first initialization voltage at a first level to the display panel through an initialization voltage line during an active period of the low power mode and to output a second initialization voltage at a second level to the display panel through the initialization voltage line during at least a portion of a blank period of the low power mode, wherein the second level is higher than the first level, wherein
the display panel includes a plurality of pixels, each of the pixels including:
an organic light-emitting diode; and
a first transistor to drive the organic light-emitting diode with a current corresponding to the first image and the second image, and wherein
the first transistor is initialized with the first initialization voltage supplied through the initialization voltage line during the active period of the low power mode, wherein
each of the pixels includes a seventh transistor connected between the initialization voltage line and an anode of the organic light-emitting diode, the seventh transistor being to turn on based on a second scan signal to initialize the anode of the organic light-emitting diode.

2. The apparatus as claimed in claim 1, wherein the power supply is to:

output the first initialization voltage during a first period of the blank period of the low power mode, and
output the second initialization voltage during a second period that is subsequent to the first period of the blank period.

3. The apparatus as claimed in claim 2, wherein a length of the first period is substantially equal to a length of a blank period of the normal mode.

4. The apparatus as claimed in claim 1, wherein:
the first transistor includes a gate electrode connected to a second node, a first electrode connected to a first node, and a second electrode connected to a third node, and each of the pixels further includes
a second transistor including a gate electrode connected to a first scan line, a first electrode connected to a data line, and a second electrode connected to the first node;
a capacitor connected between a first power voltage line and the second node;
a third transistor including a gate electrode connected to the first scan line, a first electrode connected to the third node, and a second electrode connected to the second node;
a fourth transistor including a gate electrode connected to a second scan line, a first electrode connected to the initialization voltage line, and a second electrode connected to the second node;
a fifth transistor including a gate electrode connected to an emission control line, a first electrode connected to the first power voltage line, and a second electrode connected to the first node; and
a sixth transistor including a gate electrode connected to the emission control line, a first electrode connected to the third node, and a second electrode connected to the anode of the organic light-emitting diode.

5. The apparatus as claimed in claim 4, wherein the second initialization voltage is a value that is equal to a voltage of the gate electrode of the first transistor of each of the plurality of pixels or a value that is equal to an average of voltages of gate electrodes of a plurality of first transistors of the plurality of pixels.

6. The apparatus as claimed in claim 4, wherein:
during a first portion of the blank period of the low power mode, the fifth transistor and the sixth transistor are turned on, the first to fourth transistors are turned off, and the second initialization voltage is applied to the initialization voltage line; and
during a second portion of the blank period of the low power mode, the fifth transistor and the sixth transistor are turned on, the first to fourth transistors are turned off, and the first initialization voltage is applied to the initialization voltage line.

7. The apparatus as claimed in claim 4, wherein each of the pixels includes:
an auxiliary capacitor connected between the second node and the initialization voltage line.

8. The apparatus as claimed in claim 7, wherein the power supply is to:
output the first initialization voltage during a first period of the blank period of the low power mode, and
increasingly output the second initialization voltage from the first level to the second level during a second period subsequent to the first period of the blank period.

9. A method of driving a display apparatus to display an image, the method comprising:
outputting a first initialization voltage at a first level to a display panel through an initialization voltage line during an active period of a low power mode; and outputting a second initialization voltage at a second level the display panel through the initialization voltage line during at least a portion of a blank period of the low power mode, wherein the second level is higher than the first level and wherein the display panel operates at a first driving frequency in normal mode and a second driving frequency in the low power mode, the second driving frequency lower than the first driving frequency, wherein the display panel includes a plurality of pixels, each of the pixels including:
an organic light-emitting diode; and
a first transistor to drive the organic light-emitting diode with a current corresponding to the image, and wherein the first transistor is initialized with the first initialization voltage during the active period of the low power mode, wherein each of the pixels includes a seventh transistor connected between the initialization voltage line and an anode of the organic light-emitting diode, the method including turning on the seventh transistor based on a second scan signal to initialize the anode of the organic light-emitting diode.

10. The method as claimed in claim 9, wherein outputting the second initialization voltage includes:
outputting the first initialization voltage during a first period of the blank period of the low power mode, and
outputting the second initialization voltage during a second period that is subsequent to the first period of the blank period.

11. The method as claimed in claim 10, wherein a length of the first period is substantially equal to a length of a blank period of the normal mode.

12. The method as claimed in claim 9, wherein:
the first transistor includes a gate electrode connected to a second node, a first electrode connected to a first node, and a second electrode connected to a third node, and each of the pixels further includes
a second transistor including a gate electrode connected to a first scan line, a first electrode connected to a data line, and a second electrode connected to the first node;
a capacitor connected between a first power voltage line and the second node;
a third transistor including a gate electrode connected to the first scan line, a first electrode connected to the third node, and a second electrode connected to the second node;
a fourth transistor including a gate electrode connected to a second scan line, a first electrode connected to the initialization voltage line, and a second electrode connected to the second node;
a fifth transistor including a gate electrode connected to an emission control line, a first electrode connected to the first power voltage line, and a second electrode connected to the first node; and
a sixth transistor including a gate electrode connected to the emission control line, a first electrode connected to the third node, and a second electrode connected to the anode of the organic light-emitting diode.

13. The method as claimed in claim 12, wherein:
the second initialization voltage is a value that is equal to a voltage of the gate electrode of the first transistor of each of the plurality of pixels, or
a value that is equal to an average of voltages of gate electrodes of a plurality of first transistors of the plurality of pixels.

14. The method as claimed in claim 12, wherein:
during a first portion of the blank period of the low power mode, the method includes turning on the fifth transistor and the sixth transistor, turning off the first to fourth transistors, and applying the second initialization voltage to the initialization voltage line; and
during a second portion of the blank period of the low power mode, the method includes turning on the fifth transistor and the sixth transistor, turning off the first to fourth transistors, and applying the first initialization voltage to the initialization voltage line.

15. The method as claimed in claim 12, wherein each of the pixels includes an auxiliary capacitor connected between the second node and the initialization voltage line.

16. The method as claimed in claim 15, wherein outputting of the second initialization voltage includes:
outputting the first initialization voltage during a first period of the blank period of the low power mode, and
increasingly outputting the second initialization voltage from the first level to the second level during a second period that is subsequent to the first period of the blank period.

* * * * *